(12) United States Patent
Pu et al.

(10) Patent No.: US 11,223,832 B2
(45) Date of Patent: Jan. 11, 2022

(54) METHODS AND APPARATUS FOR ENCODING VIDEO DATA USING BLOCK PALETTES AND SUB-BLOCK AND PIXEL SCANNING ORDERS

(71) Applicant: QUALCOMM Incorporated, San Diego, CA (US)

(72) Inventors: Wei Pu, San Diego, CA (US); Rajan Laxman Joshi, San Diego, CA (US); Joel Sole Rojals, La Jolla, CA (US); Feng Zou, San Diego, CA (US); Marta Karczewicz, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 14/807,687

(22) Filed: Jul. 23, 2015

(65) Prior Publication Data

US 2016/0029028 A1    Jan. 28, 2016

Related U.S. Application Data

(60) Provisional application No. 62/028,652, filed on Jul. 24, 2014.

(51) Int. Cl.
*H04N 7/12* (2006.01)
*H04N 19/176* (2014.01)
(Continued)

(52) U.S. Cl.
CPC ........... *H04N 19/176* (2014.11); *H04N 19/11* (2014.11); *H04N 19/129* (2014.11);
(Continued)

(58) Field of Classification Search
CPC .. H04N 19/129; H04N 19/182; H04N 19/186; H04N 19/93
See application file for complete search history.

(56) References Cited

U.S. PATENT DOCUMENTS

| 2004/0151372 A1 | 8/2004 | Reshetov et al. |
| 2004/0156543 A1 | 8/2004 | Gardella et al. |

FOREIGN PATENT DOCUMENTS

| WO | 2006092616 A2 | 9/2006 |
| WO | 2015139040 A2 | 9/2015 |
| WO | 2015192800 A1 | 12/2015 |

OTHER PUBLICATIONS

Ausbeck P.J., "The Piecewise-Constant Image Model", Proceedings of the IEEE, IEEE, New York, US, vol. 88, No. 11, Nov. 1, 2000 (Nov. 1, 2000), pp. 1779-1789, XP011450786, ISSN: 0018-9219, DOI: 10.1109/5.892713.

(Continued)

*Primary Examiner* — Y Lee
(74) *Attorney, Agent, or Firm* — Shumaker & Sieffert, P.A.

(57) ABSTRACT

The method includes receiving video blocks that are each associated with a table having entries specifying pixel values used in the blocks. The method further includes dividing the blocks into sub-blocks each having an array of pixels. The method also includes selecting a sub-block scanning order that specifies an order in which the plurality of sub-blocks are to be encoded and a pixel scanning order that specifies an order in which the pixels of each sub-block are to be encoded. The scanning order and the pixel scanning order are selected based at least in part upon pixel value distributions and a bit rate for encoding the block according to the scanning or pixel scanning order, respectively. The blocks (Continued)

are then encoded using the selected scanning order and pixel scanning order and the index values in the table.

15 Claims, 16 Drawing Sheets

(51) Int. Cl.
| | |
|---|---|
| *H04N 19/463* | (2014.01) |
| *H04N 19/186* | (2014.01) |
| *H04N 19/94* | (2014.01) |
| *H04N 19/93* | (2014.01) |
| *H04N 19/11* | (2014.01) |
| *H04N 19/182* | (2014.01) |
| *H04N 19/593* | (2014.01) |
| *H04N 19/129* | (2014.01) |
| *H04N 19/70* | (2014.01) |

(52) U.S. Cl.
CPC ......... *H04N 19/182* (2014.11); *H04N 19/186* (2014.11); *H04N 19/463* (2014.11); *H04N 19/593* (2014.11); *H04N 19/70* (2014.11); *H04N 19/93* (2014.11); *H04N 19/94* (2014.11)

(56) References Cited

OTHER PUBLICATIONS

Bugdayci D., et al., "AHG10: Improvements On Palette Coding", 17. JCT-VC Meeting; Mar. 27, 2014-Apr. 4, 2014; Valencia; (Joint Collaborative Team On Video Coding of ISO/IEC JTC1/SC29/WG11 and ITU-T SG.16); No. JCTVC-Q0071-V2, Mar. 28, 2014 (Mar. 28, 2014), 8 pages, XP030115970.
Guo L., et al., "Palette Mode for Screen Content Coding", 13. JCT-VC Meeting; 104. MPEG Meeting; Apr. 18, 2013-Apr. 26, 2013; Incheon; (Joint Collaborative Team On Video Coding of ISO/IEC JTC1/SC29/WG11 and ITU-TSG.16); URL: http://WFTP3.ITU.INT/AV-ARCH/JCTVC-SITE/, No. JCTVC-M0323, Apr. 9, 2013 (Apr. 9, 2013), XP030114280.
Guo X., et al., "AHG8: Major-Color-Based Screen Content Coding", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://WFTP3.ITU.INT/AV-ARCH/JCTVC-SITE/, No. JCTVC-00182-v3, Oct. 25, 2013 (Oct. 25, 2013), XP030115219.
International Search Report and Written Opinion—PCT/US2015/042120—ISA/EPO—dated Dec. 21, 2015.
Kobayashi M., et al., "Lossless Compression for Compound Color Document Images", Asia Display / IDW '01, HCS2-2, London UK, Jan. 1, 2001 (Jan. 1, 2001), pp. 1525-1528, XP007015578.
Partial International Search Report—PCT/US2015/042120—ISA/EPO—dated Oct. 7, 2015.
Sansli D.B., et al.,"SCCE3: Test B.15 Scanning Indicator for The Palette Coded CUs", 18. JCT-VC Meeting, Jun. 30, 2014-Jul. 9, 2014, Sapporo, (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-R0048, Jun. 20, 2014 (Jun. 20, 2014), 3 pages, XP030116287.
Xiu X., et al., "Description of Screen Content Coding Technology Proposal by InterDigital", 17. JCT-VC Meeting; Mar. 27, 2014-Apr. 4, 2014; Valencia; (Joint Collaborative Team On Video Coding of ISO/IEC JTC1/SC29/WG11 and ITU-T SG.16); URL: http://WFTP3.ITU.INT/AV-ARCH/JCTVC-SITE/, No. JCTVC-Q0037, Mar. 18, 2014 (Mar. 18, 2014), 30 pages, XP030115927.
Yang E-H., et al., "Entropy Constrained Color Splitting for Palette Images", Multimeaa and Expo, 2009. ICME 2009, IEEE International Conference On, IEEE, Piscataway, NJ, USA, Jun. 28, 2009 (Jun. 8, 2009), pp. 109-112, XP031510704, D01: 10.1109/ICME.2009.5202448 ISBN: 978-1-4244-4290-4.
Zhu J., et al., "AHG10: Adaptive Scan Order on Palette Based Coding", 17. JCT-VC Meeting, Mar. 27, 2014-Apr. 4, 2014, Valencia, (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-Q0169-v2, Mar. 29, 2014 (Mar. 29, 2014), 4 pages, XP030116116.
Zhu W., et al., "Palette-Based Compound Image Compression in HEVC by Exploiting Non-Local Spatial Correlation," IEEE International Conference on Acoustic, Speech and Signal Processing (ICASSP), May 4, 2014 (May 4, 2014), pp. 7348-7352, XP032617356, DOI: 10.1109/ICASSP.2014.6855027.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.263, "Video Coding for Low Bit Rate Communication", Series H: Audiovisual and Multimedia Systems, Infrastructure of audiovisual services—Coding of moving video, Jan. 2005, 226 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
Response to Written Opinion dated Dec. 21, 2015, from U.S. Appl. No. PCT/US2015/042120, filed on May 12, 2016, 4 pp.
Second Written Opinion from U.S. Appl. No. PCT/US2015/042120, dated Jul. 5, 2016, 14 pp.
Response to Written Opinion dated Jul. 5, 2016, from U.S. Appl. No. PCT/US2015/042120, filed on Sep. 2, 2016, 10 pp.
International Preliminary Report on Patentability from U.S. Appl. No. PCT/US2015/042120, dated Sep. 27, 2016, 14 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
He G., et al., "Intra Prediction Architecture for H.264/AVC QFHD Encoder", Picture Coding Symposium 2010; Dec. 8, 2010-Dec. 10, 2010; Nagoya, Dec. 8, 2010 (Dec. 8, 2010), XP030082026, pp. 450-453.
Karczewicz M., et al., "Palette Mode for Screen Content Coding", JCTVC-M0323 r2, 13th JCTVC Meeting, Apr. 18-26, 2013, Incheon, KR, (Joint Collaborative Team on Video Coding Of ISO/IEC JTC1/SC29/WG11 and ITU-T SG.16), Apr. 20, 2013, pp. 1-12.

| | | | | | | | |
|---|---|---|---|---|---|---|---|
| 1 | 1 | 1 | 1 | 3 | 3 | 3 | 3 |
| 1 | 1 | 1 | 1 | 3 | 3 | 3 | 3 |
| 1 | 1 | 1 | 1 | 3 | 3 | 3 | 3 |
| 1 | 1 | 1 | 1 | 3 | 3 | 3 | 3 |
| 1 | 1 | 1 | 1 | 4 | 4 | 4 | 4 |
| 1 | 1 | 1 | 1 | 4 | 4 | 4 | 4 |
| 1 | 1 | 1 | 1 | 4 | 4 | 4 | 4 |
| 1 | 1 | 1 | 1 | 4 | 4 | 4 | 4 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |

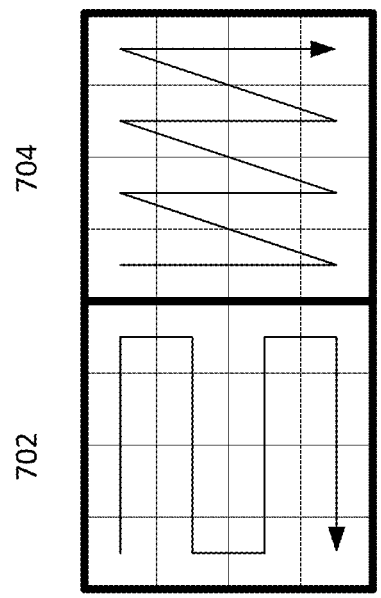
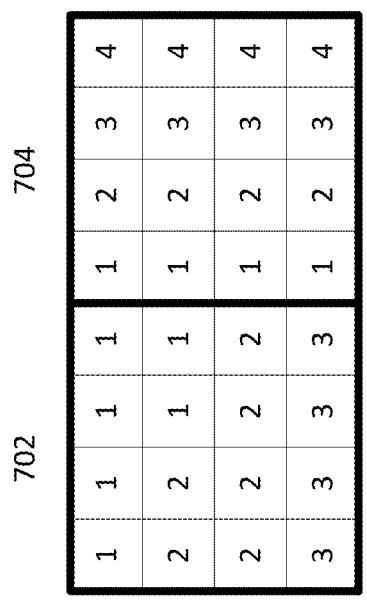
FIG. 7B
FIG. 7A

METHODS AND APPARATUS FOR ENCODING VIDEO DATA USING BLOCK PALETTES AND SUB-BLOCK AND PIXEL SCANNING ORDERS

INCORPORATION BY REFERENCE TO PRIORITY APPLICATION(S)

This application claims the priority and benefit of U.S. Provisional No. 62/028,652, filed on Jul. 24, 2014, which is hereby incorporated by reference in its entirety. Any and all applications for which a foreign or domestic priority claim is identified in the Application Data Sheet as filed with the present application are hereby incorporated by reference under 37 CFR 1.57.

TECHNICAL FIELD

This disclosure is related to the field of video coding. More particularly, it is applicable to the use of palettes for indexing pixel value data when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video data may comprise pixels having pixel values indicating a color associated with the pixel. A pixel value may contain one color component (e.g., a luma value), two components (e.g., two chroma values), or a triplet of three color components (e.g., RGB color components, YUV color components, and/or the like). In order to reduce the bit rate of an encoded video bitstream, palettes may be used to index pixel values that are present in the video data.

SUMMARY

The systems, methods and devices of this disclosure each have several innovative aspects, no single one of which is solely responsible for the desirable attributes disclosed herein. Without limiting the scope of the appended claims, certain features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In accordance with one or more aspects of the present disclosure, there is provided a method for encoding video data. The method may comprise receiving video data comprising one or more blocks, each block associated with a palette comprising one or more palette entries specifying pixel values used in an associated block of the palette. For a block of the one or more blocks, the method may further comprise dividing the block into a plurality of sub-blocks, each sub-block comprising an array of pixels within the block, and selecting a sub-block scanning order for the sub-blocks of the block specifying an order that the plurality of sub-blocks are to be encoded, based at least in part upon a distribution of pixel values within the block. For a first sub-block of the plurality of sub-blocks, the method may further comprise selecting a pixel scanning order for the first sub-block specifying an order that the pixels of the first sub-block are to be encoded, based at least in part upon a distribution of pixel values within the first sub-block, and encoding the block using the selected sub-block scanning order, wherein the first sub-block is encoded using its selected pixel scanning order, wherein at least a portion of the pixels of the first sub-block are encoded using index values corresponding to palette entries of the palette.

In some embodiments, the first sub-block may comprise an array of 4×4 pixels. In some embodiments, pixel values may comprise color component values.

In some embodiments, selecting a pixel scanning order for the first sub-block may comprise identifying a plurality of potential pixel scanning orders, evaluating a cost for each of the plurality of potential pixel scanning orders, wherein a cost for a potential pixel scanning order of the plurality of potential pixel scanning orders indicates a bitstream length that would be associated with the first sub-block if the potential pixel scanning order is used for the first sub-block, and selecting a potential pixel scanning order having a lowest cost.

In some embodiments, the plurality of potential pixel scanning orders may comprise at least one of: horizontal scanning order, vertical scanning order, horizontal traverse scanning order, and vertical traverse scanning order.

In some embodiments, the method may further comprise associating the first sub-block with a sub-block palette, wherein the sub-block palette references a subset of the palette entries corresponding to pixel values used in the pixels of the first sub-block. The sub-block palette may comprise a plurality of entries, each entry comprising a pointer to a corresponding entry of the palette.

In some embodiments, a pixel in the first sub-block is designated an escape pixel, indicating that the pixel of the first sub-block has a pixel value that does not correspond to a pixel value associated with the sub-block palette. The pixel value associated with the escape pixel may be encoded after the pixels of the first sub-block that are not designated as escape pixels are encoded.

In some embodiments, the first sub-block may be encoded using run-length coding, wherein a run-length value is truncated based at least in part upon a run-length upper bound corresponding to a number of pixels in the first sub-block.

In some embodiments, the method may further comprise, for a second sub-block of the plurality of sub-blocks, wherein the second sub-block neighbors the first sub-block, determining a pixel scanning order for the second sub-block based at least in part upon the pixel scanning order for the first sub-block.

Another aspect of the disclosure provides a method for encoding video data. The method may comprise receiving video data comprising one or more blocks, each block associated with a palette comprising one or more palette entries specifying pixel values used in an associated block of the palette, and, for a block of the one or more blocks:

dividing the block into a plurality of sub-blocks, each sub-block comprising an array of pixels within the block, and for a first sub-block of the plurality of sub-blocks: (i) determining a pixel value of a designated pixel in a neighboring sub-block, (ii) determining whether or not the pixels of the first sub-block have the same pixel value as the designated pixel of the neighboring sub-block, and (iii) signaling a flag indicating that the pixels of the first sub-block have the same pixel value was the designated pixel, in response to a determination that the pixels of the first sub-block have the same pixel value as the designated pixel of the neighboring sub-block, wherein determining the pixel value of the designated pixel comprises determining an index value of the designated pixel, wherein the index value corresponds to a palette entry of the palette.

In some embodiments, the neighboring sub-block comprises a sub-block left of the first sub-block or a sub-block above the first sub-block. The designated pixel may comprise a top pixel of a leftmost column of the neighboring sub-block or a leftmost pixel of a bottom row of the neighboring sub-block.

In some embodiments, if the flag is signaled, the pixel values of the pixels of the first sub-block are not encoded. In some embodiments, the flag may not be signaled in response to a determination that not all pixels of the first sub-block have the same pixel value as the designated pixel.

In some embodiments, if the flag is not signaled, the method may further comprise associating the first sub-block with a sub-block palette, the sub-block palette indicating a subset of the entries of the palette corresponding to pixel values used in the pixels of the sub-block. The sub-block palette may comprise a plurality of entries, each entry comprising a pointer to a corresponding entry of the palette. In some embodiments, a pixel in a first sub-block may be an escape pixel having a pixel value that does not correspond to a pixel value associated with the sub-block palette, and wherein the pixel value associated with the escape pixel is encoded after the pixels of the first sub-block that are not designated as escape pixels are encoded. The sub-block may be encoded using run-length coding, wherein a run-length value is truncated based at least in part upon a run-length upper bound corresponding to a number of pixels in the sub-block.

Another aspect of the disclosure provides a video encoder. The video encoder may comprise a memory configured to store video data, and a processor in communication with the memory. In some embodiments, the processor may be configured to receive video data comprising one or more blocks, each block associated with a palette comprising one or more palette entries specifying pixel values used in an associated block of the palette, and, for a block of the one or more blocks, divide the block into a plurality of sub-blocks, each sub-block comprising an array of pixels within the block. In addition, the processor may be configured to select a sub-block scanning order for the sub-blocks of the block specifying an order that the plurality of sub-blocks are to be encoded, based at least in part upon a distribution of pixel values within the block, and, for a first sub-block of the plurality of sub-blocks, select a pixel scanning order for the first sub-block specifying an order that the pixels of the first sub-block are to be encoded, based at least in part upon a distribution of pixel values within the first sub-block. The processor may be further configured to encode the block using the selected sub-block scanning order, wherein the first sub-block is encoded using its selected pixel scanning order, wherein at least a portion of the pixels of the first sub-block are encoded using index values corresponding to palette entries of the palette.

In some embodiments, the first sub-block comprises an array of 4×4 pixels. The pixel values may comprise color component values.

In some embodiments, the processor selects a pixel scanning order for the first sub-block by identifying a plurality of potential pixel scanning orders, evaluating a cost for each of the plurality of potential pixel scanning orders, wherein a cost for a potential pixel scanning order of the plurality of potential pixel scanning orders indicates a bitstream length that would be associated with the first sub-block if the potential pixel scanning order is used for the first sub-block, and selecting a potential pixel scanning order having a lowest cost. The plurality of potential pixel scanning orders may comprise at least one of: horizontal scanning order, vertical scanning order, horizontal traverse scanning order, and vertical traverse scanning order.

In some embodiments, the processor is further configured to associate the first sub-block with a sub-block palette, the sub-block palette referencing a subset of the palette entries corresponding to pixel values used in the pixels of the first sub-block. The sub-block palette may comprise a plurality of entries, each entry comprising a pointer to a corresponding entry of the palette. In some embodiments, a pixel in the first sub-block may be designated an escape pixel, indicating that the pixel of the first sub-block has a pixel value that does not correspond to a pixel value associated with the sub-block palette, and wherein the pixel value associated with the escape pixel is encoded after the pixels of the first sub-block that are not designated as escape pixels are encoded.

In some embodiments, the first sub-block may be encoded using run-length coding, wherein a run-length value is truncated based at least in part upon a run-length upper bound corresponding to a number of pixels in the first sub-block.

In some embodiments, the processor may be further configured to, for a second sub-block of the plurality of sub-blocks, wherein the second sub-block neighbors the first sub-block, determine a pixel scanning order for the second sub-block based at least in part upon the pixel scanning order for the first sub-block.

Another aspect of the disclosure provides a video encoder. The video encoder may comprise a memory configured to store video data, and a processor in communication with the memory. In some embodiments, the processor may be configured to receive video data comprising one or more blocks, each block associated with a palette comprising one or more palette entries specifying pixel values used in an associated block of the palette. For a block of the one or more blocks, the processor may further divide the block into a plurality of sub-blocks, each sub-block comprising an array of pixels within the block, and, for a first sub-block of the plurality of sub-blocks: (i) determine a pixel value of a designated pixel in a neighboring sub-block, (ii) determine whether or not the pixels of the first sub-block have the same pixel value as the designated pixel of the neighboring sub-block, and (iii) signal a flag indicating that the pixels of the first sub-block have the same pixel value was the designated pixel, in response to a determination that the pixels of the first sub-block have the same pixel value as the designated pixel of the neighboring sub-block, wherein determining the pixel value of the designated pixel comprises determining an index value of the designated pixel, wherein the index value corresponds to a palette entry of the palette.

In some embodiments, the neighboring sub-block comprises a sub-block left of the first sub-block or a sub-block above the first sub-block. The designated pixel may comprise a top pixel of a leftmost column of the neighboring sub-block or a leftmost pixel of a bottom row of the neighboring sub-block.

In some embodiments, if the flag is signaled, the pixel values of the pixels of the first sub-block are not encoded.

In some embodiments, the processor may be configured to not signal the flag in response to a determination that not all pixels of the first sub-block have the same pixel value as the designated pixel. If the flag is not signaled, the processor may associate the first sub-block with a sub-block palette, the sub-block palette indicating a subset of the entries of the palette corresponding to pixel values used in the pixels of the sub-block. The sub-block palette may comprise a plurality of entries, each entry comprising a pointer to a corresponding entry of the palette.

In some embodiments, a pixel in a sub-block of the plurality of sub-blocks may be an escape pixel, wherein the escape pixel is a pixel of the sub-block having a pixel value that does not correspond to a pixel value associated with the sub-block palette. The pixel value associated with the escape pixel may be encoded after the pixels of the first sub-block that are not designated as escape pixels are encoded.

In some embodiments, if the flag is not signaled, the sub-block is encoded using run-length coding, wherein a run-length value is truncated based at least in part upon a run-length upper bound corresponding to a number of pixels in the sub-block.

BRIEF DESCRIPTION OF DRAWINGS

FIG. 5 illustrates a portion of a block exhibiting a strong block-based pattern, in accordance with some embodiments.

FIGS. 6A and 6B illustrate different sub-block scanning orders that may be used to encode sub-blocks, in accordance with some embodiments.

FIGS. 7A and 7B illustrate two different sub-blocks that may be associated with different pixel scanning orders, in accordance with some embodiments.

DETAILED DESCRIPTION

Figure 1A:
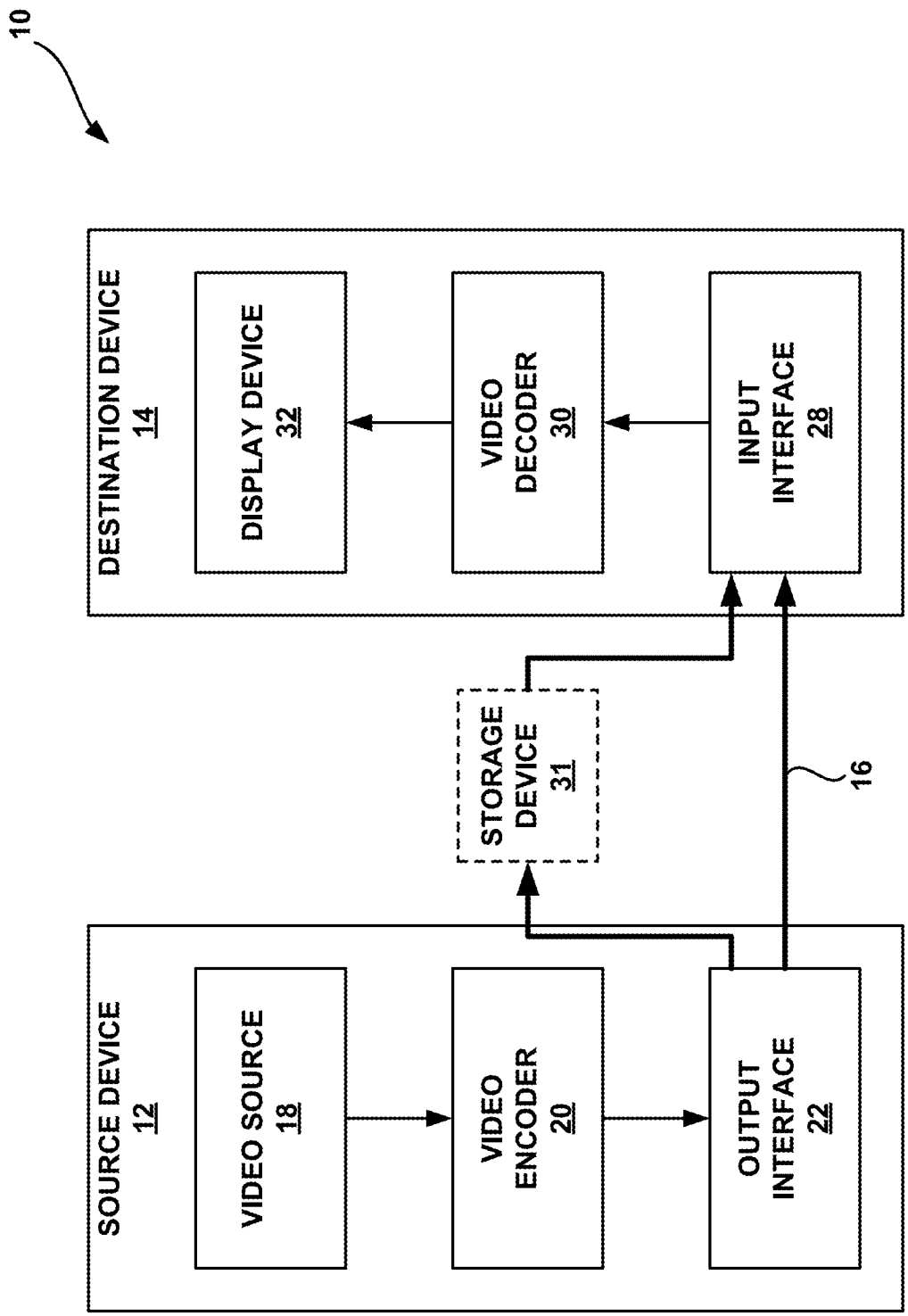
FIG. 1A is a block diagram illustrating an example video encoding and decoding system that may utilize techniques in accordance with aspects described in this disclosure.

In general, this disclosure relates to the use of palettes and sub-blocks in the context of advanced video codecs, such as High Efficiency Video Coding (HEVC). More specifically, the present disclosure relates to systems and methods for improved bit rate coding through the use of palettes and sub-blocks in the context of video coding.

Some embodiments may be implemented in the context of scalable video coding. Scalable video coding refers to video coding in which a base layer (BL), sometimes referred to as a reference layer (RL), and one or more scalable enhancement layers (ELs) are used. In scalable video coding, the BL can carry video data with a base level of quality. The one or more ELs can carry additional video data to support, for example, higher spatial, temporal, and/or signal-to-noise ratio (SNR) levels. ELs may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the BL or any intervening ELs, and at the same time serve as an RL for one or more ELs above the middle layer. Similarly, in the multiview or 3D extension of the HEVC standard, there may be multiple views, and information of one view may be utilized to code (e.g., encode or decode) the information of another view (e.g., motion estimation, motion vector prediction and/or other redundancies).

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards (e.g., including standards developed by International Telecommunication Union Telecommunication Standardization Sector [ITU-T] Video Coding Experts Group [VCEG] or International Organization for Standardization/International Electrotechnical Commission [ISO/IEC] Moving Pictures Experts Group [MPEG]): ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as a BL, and a higher layer such as an EL) of video data. A "layer" of video data may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple BLs, RLs, and/or ELs. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/ or otherwise manipulate a bitstream).

Figure 1B:
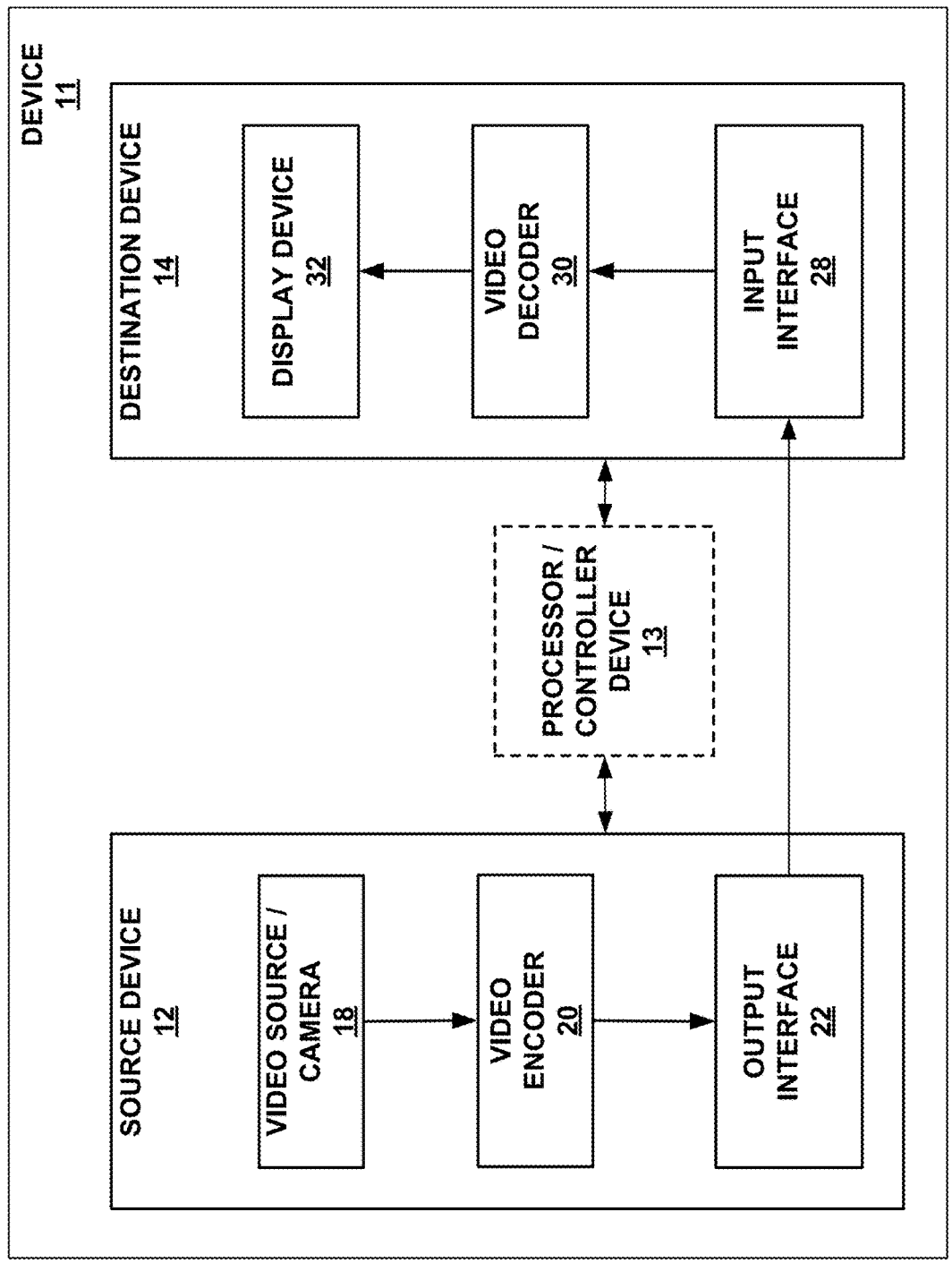
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 are on separate devices—specifically, the source device 12 is part of a source device, and the destination device 14 is part of a destination device. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via a link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network [WLAN] connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by video encoder 20. The encoded video data may be transmitted directly to the destination device 14 via the output interface 22 of the source device 12. The encoded video data may also (or alternatively) be stored onto the storage device 31 for later access by the destination device 14 or other devices, for decoding and/or playback. Video encoder 20 illustrated in FIGS. 1A and 1B may comprise video encoder 20 illustrated FIG. 2A, video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional processor/controller device 13 in operative communication with the source and destination devices 12, 14. The system 10' of FIG. 1B, and components thereof, are otherwise similar to the system 10 of FIG. 1A, and components thereof.

Video encoder 20 and video decoder 30 may operate according to a video compression standard, such as HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (e.g., codec) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPSs), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more CUs. Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
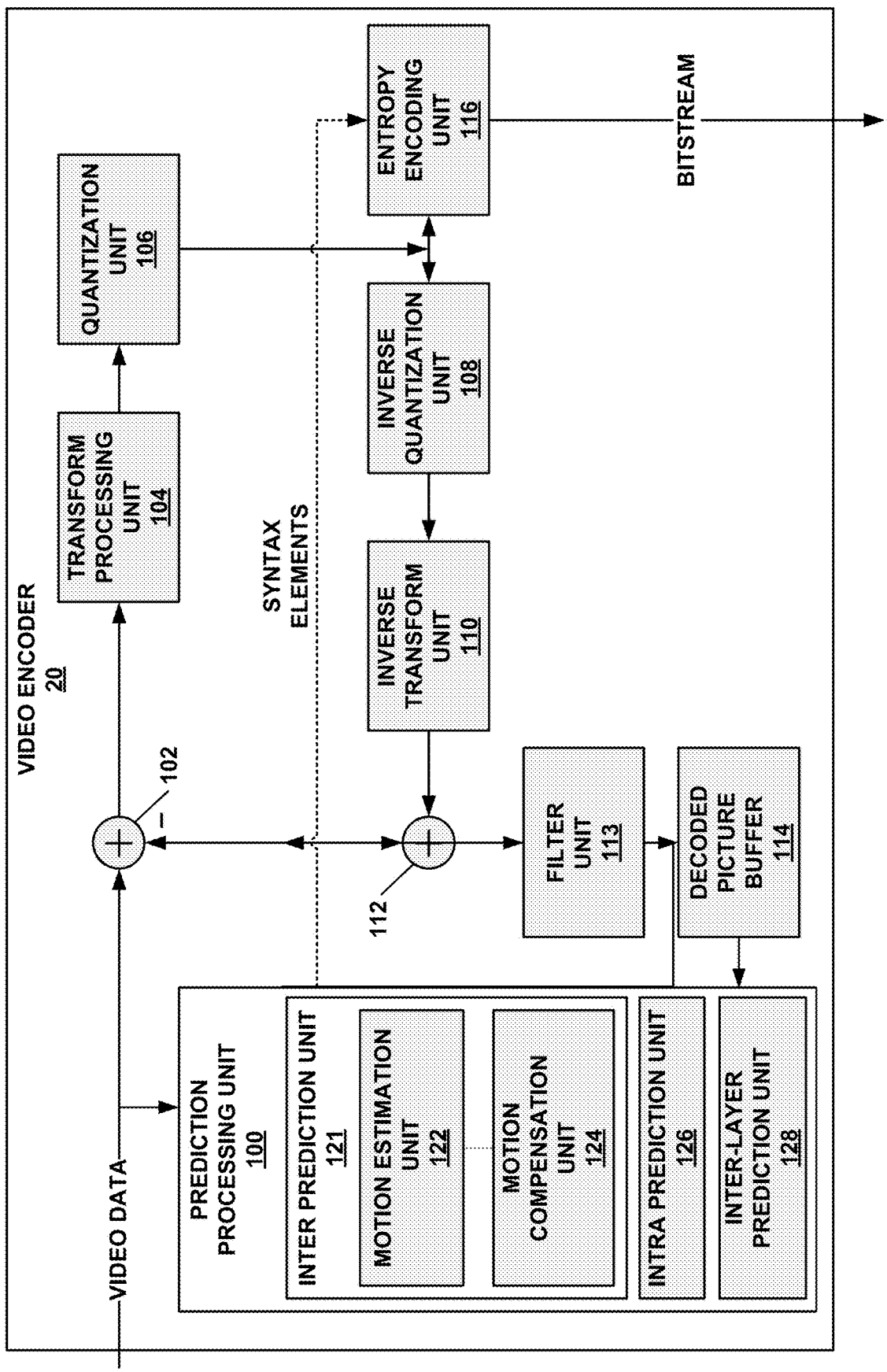
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, video encoder 20 may include interlayer prediction unit 128. Inter-layer prediction unit 128 is configured to predict a current block (e.g., a current block in the EL) using one or more different layers that are available in scalable video coding (e.g., a BL or RL). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
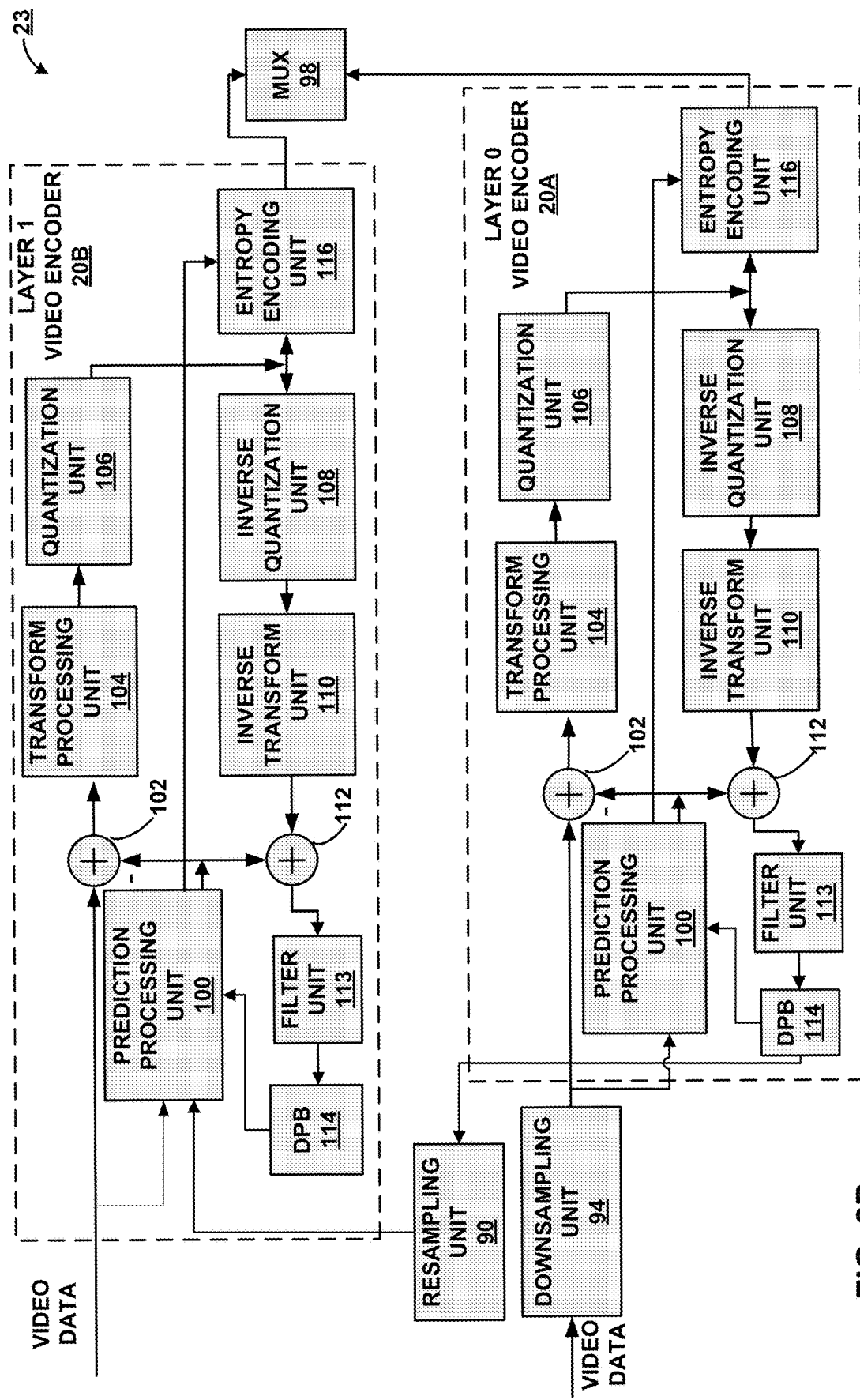
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20B, video encoder 23 may include an resampling unit 90. The resampling unit 90 may, in some cases, upsample a BL of a received video frame to, for example, create an EL. The resampling unit 90 may upsample particular information associated with the received BL of a frame, but not other information. For example, the resampling unit 90 may upsample the spatial size or number of pixels of the BL, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a BL, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
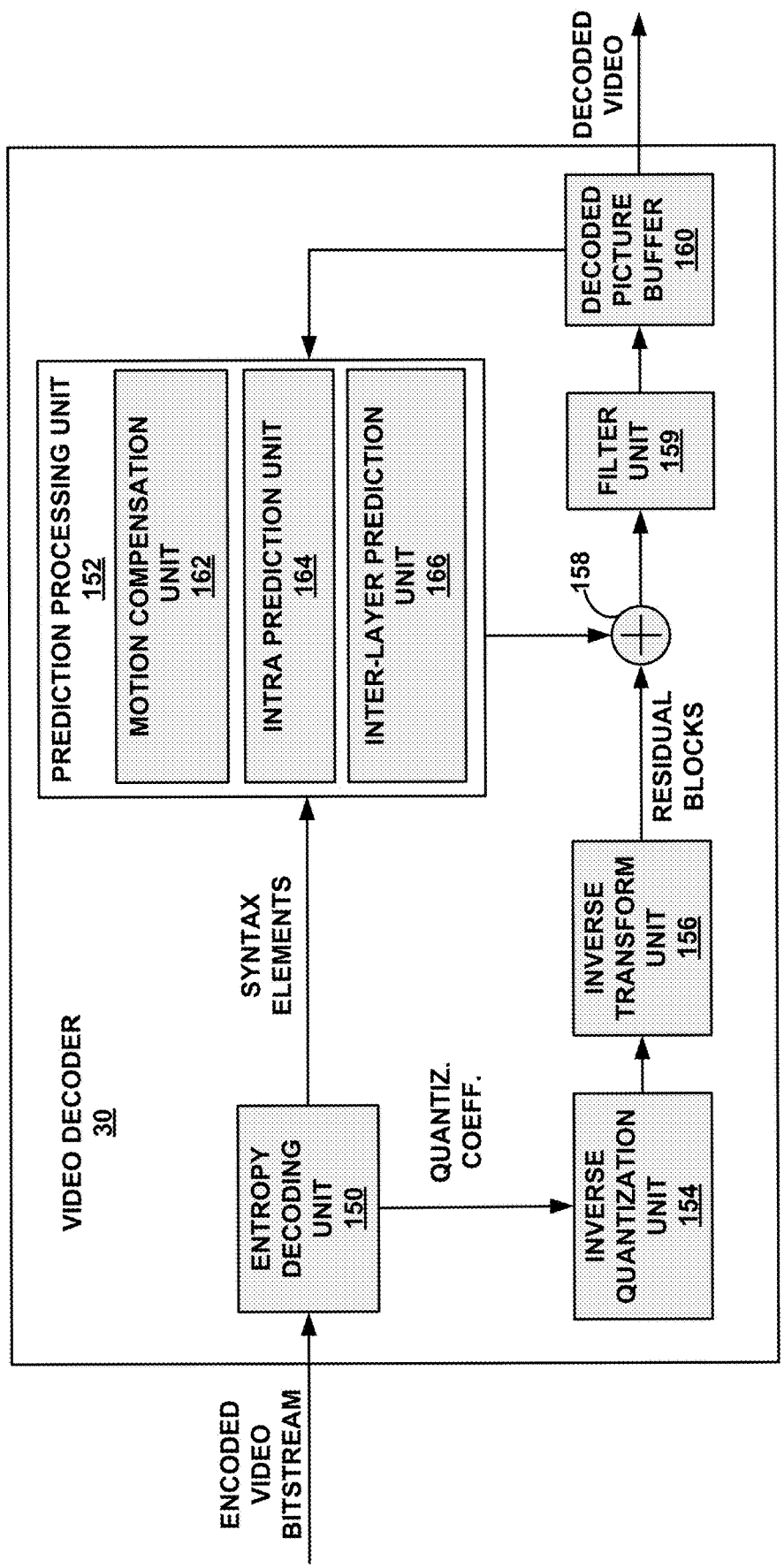
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. Video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in scalable video coding (e.g., a BL or RL). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
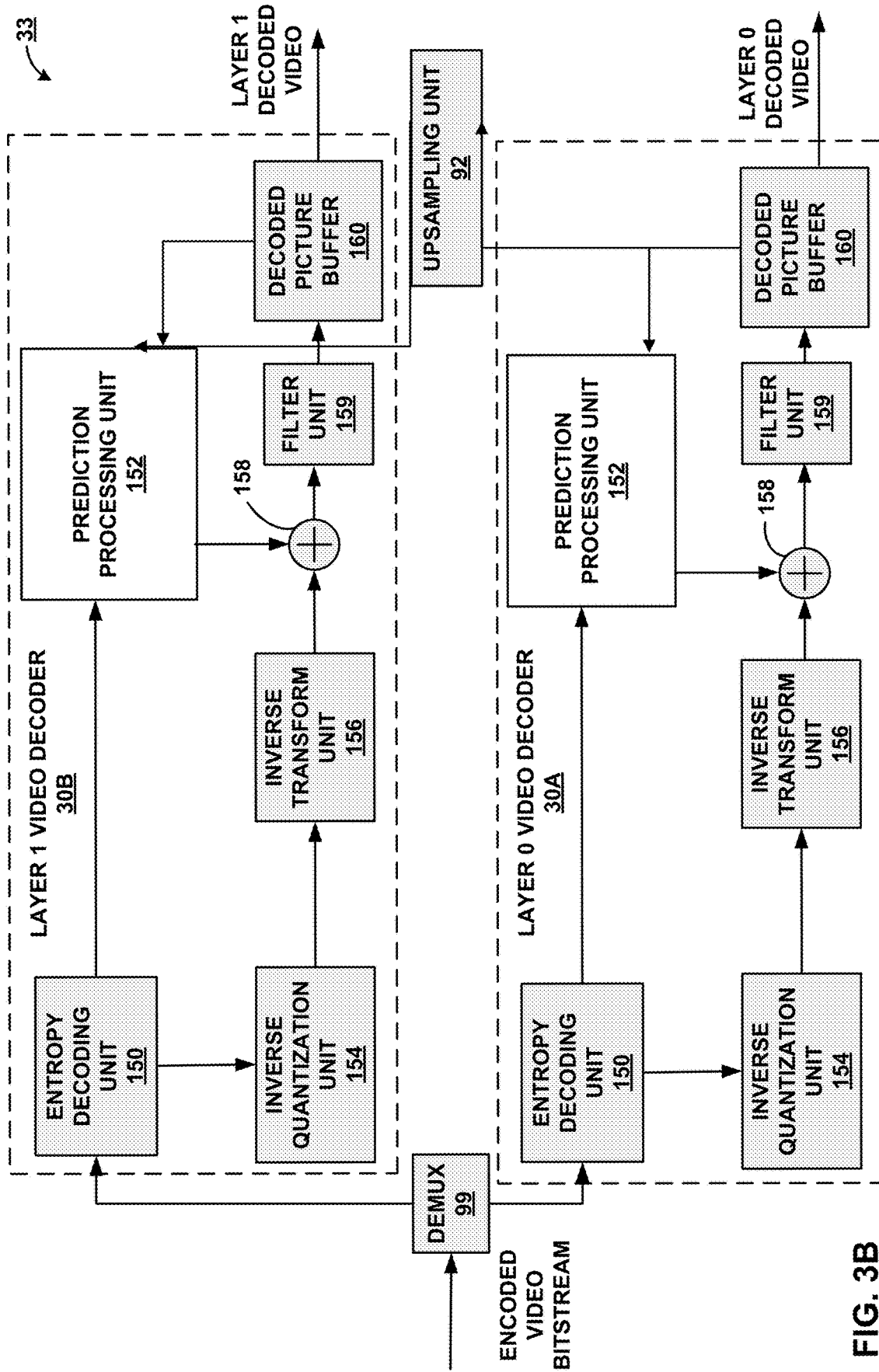
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further, video decoder 33 may be configured to perform any or all of the techniques of this disclosure.

Video decoder 33 includes a video decoder 30A and video decoder 30B, each of which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a BL of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2B. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 configured to upsample or downsample a reference picture received from the decoded picture buffer 160 of video decoder 30A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Blocks and Palettes

In some embodiments, video data may be divided into a plurality of units, hereinafter referred to as blocks. In some embodiments, blocks may correspond to CUs. In other embodiments, blocks may correspond to any desired portion of a video image (e.g., blocks may correspond to coding tree units, prediction units, transformation units, and/or the like).

In some embodiments, palettes may be used for encoding blocks of video data. A palette comprises one or more entries indexing pixel values contained within the block. For example, each entry in a palette may specify an index to be associated with a different pixel value. In some embodiments, a pixel value may contain one color component (e.g., a luma value), two components (e.g., two chroma values), or a triplet of three color components (e.g., RGB color components, YUV color components, and/or the like). Thus, instead of encoding the pixel values of each pixel, the pixels of the block may refer to the index values corresponding to their pixel values, as defined by the palette. In some embodiments, palette information for a block may be transmitted at the beginning of the block.

Through the use of palettes, the number of bits needed to encode the block may be reduced. For example, if a particular block uses sixteen different pixel values, each pixel value comprising three color components of 8 bits each, then 24 bits would be required to encode the pixel values of each pixel in the block. However, by using a palette to index the sixteen different pixel values, the pixel values may be indexed using only 4 bits. As such, only 4 bits will be needed per pixel in the block.

Figure 4:
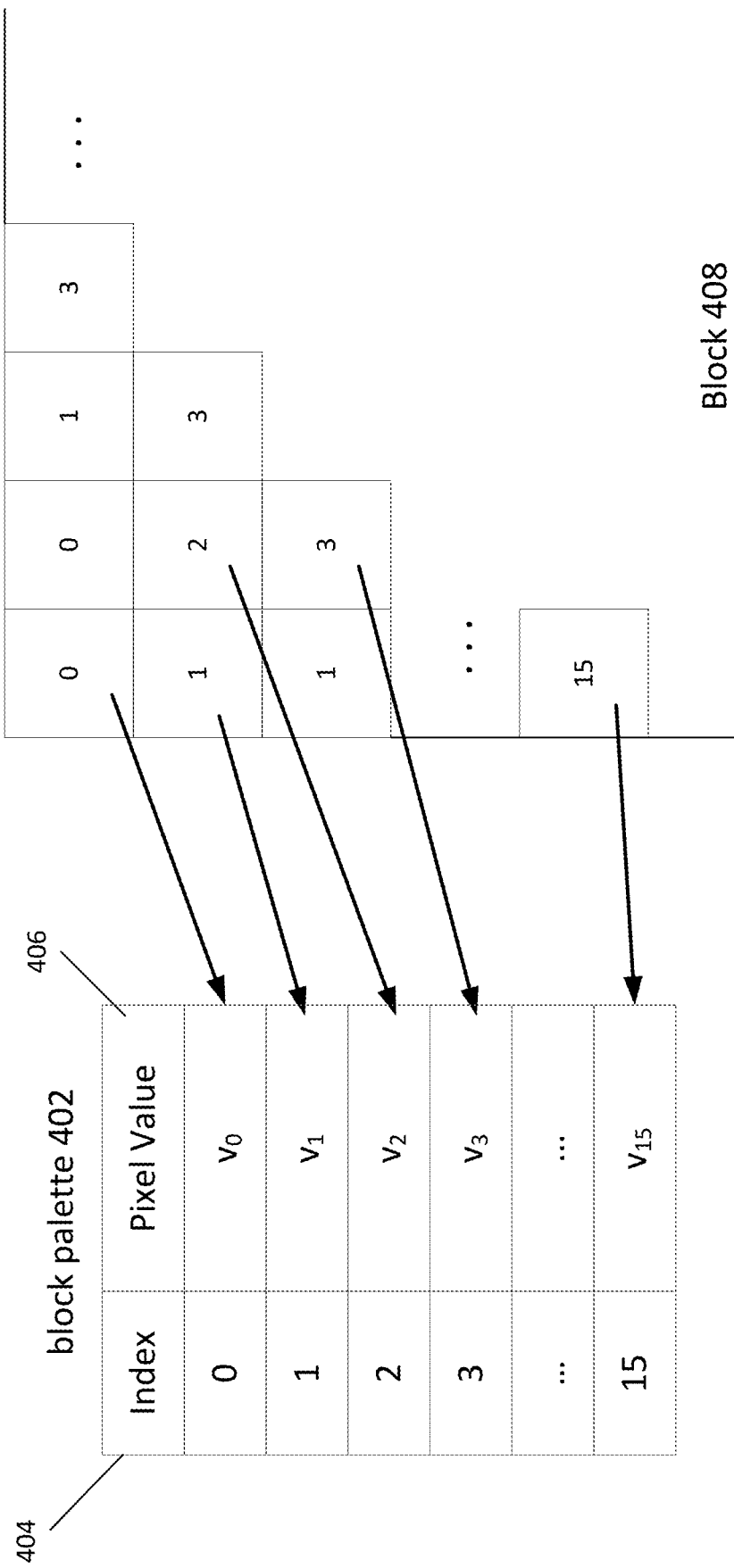
FIG. 4 illustrates a palette that may be used with a block, in accordance with some embodiments.

For example, FIG. 4 illustrates a palette that may be used with a block, in accordance with some embodiments. Palette 402 comprises a plurality of entries, each entry associating an index value 404 with a particular pixel value 406 (e.g., pixel value $v_0$ is associated with index value 0, pixel value $v_1$ is associated with index value 1, etc.). Thus, full pixel values do not need to be specified for each pixel in block 408. Instead, the pixels are associated with index values from palette 402, from which the pixel value of the pixel can then be determined.

In some embodiments, a palette for a particular block may comprise entries for all of the different pixel values that appear in the block. In some embodiments, the palette may instead comprise entries for a subset of the pixel values that appear in the block (e.g., the most common pixel values in the block, pixel values associated with at least a threshold amount of pixels within the block, and/or the like).

In some embodiments, encoding video data using blocks and palettes may be used for encoding screen content (e.g., in accordance with the HEVC screen content coding extension). Screen content or screen images may refer to computer generated images or graphics, as opposed to natural content or natural images (e.g., video images captured through a camera). In comparison to natural content, screen content often exhibits less gradual transitions and more sharp edges, as well as a more finite number of possible color or pixel values. In some embodiments, screen content may encompass hybrid images. For example, a video may contain an image of a computer screen having natural video on a first portion of the screen (e.g., in a media player), and screen content (e.g., an open document, a computer-generated user interface, and/or the like) displayed on a second portion of the screen. However, while the present specification may refer to blocks and palettes being used to encode screen content video data, it is understood that the systems and methods disclosed herein may be applied to other types of video as well.

Sub-Blocks

In many types of video images, which many include both natural images and computer generated screen images, pixels neighboring each other tend to have a higher likelihood of having the same or similar pixel values. As such, many video images may exhibit a strong block-based pattern. For example, FIG. 5 illustrates a portion of a block 500 exhibiting a strong block-based pattern, in accordance with some embodiments. The illustrated portion of the block 500 may be divided into a plurality of sub-blocks (sub-blocks 502, 504, 506, 508, 510, and 512), each sub-block containing pixels having the same pixel values.

Thus, in some embodiments, each block may be divided into a plurality of sub-blocks, each sub-block comprising an array of pixels located within the block. For example, as illustrated in FIG. 5, a sub-block may comprise a square 4×4 array of pixels. In some embodiments, a sub-block may comprise a square array of K×K pixels, wherein K corresponds to an integer value, or a non-square array of pixels. In some embodiments, the size of the sub-blocks is predetermined. It is understood that while FIG. 5 illustrates sub-blocks as containing pixels having the same pixel value, it is understood that in other embodiments, a particular sub-block may contain pixels with two or more different pixel values.

Adaptive Scanning Order

When encoding blocks of video data, it is necessary to determine in what order the pixels and/or sub-blocks of the block are to be encoded. The order of pixels and/or sub-blocks to be encoded may hereinafter be referred to as a scanning order. Scanning orders may comprise horizontal scanning orders and vertical scanning orders. Other types of scanning orders, such as diagonal or zigzag scanning orders, or horizontal traverse scanning or vertical traverse scanning (i.e. snake-shape), may also be used. In some embodiments, a scanning order to be used by the block may be predetermined. Alternatively, a scanning order to be used may be signaled into the bitstream. In some embodiments, in order to reduce the bits needed to encode the video, scanning orders may be adaptively chosen.

In embodiments where a block is divided into multiple sub-blocks (e.g., as illustrated in FIG. 5), the block may be associated with a sub-block scanning order, indicating an order that the sub-blocks that make up the block are encoded. In addition, a sub-block may be associated with a pixel scanning order, indicating an order that the pixels that make up the sub-block are encoded. These orders may be predefined, which are known to the decoder and encoder, or signaled into the bitstream or adaptively updated according to neighboring pixel values, the position of the sub-block in the block, and/or other characteristics of the neighboring decoded blocks or sub-blocks.

Figures 6A, 6B:
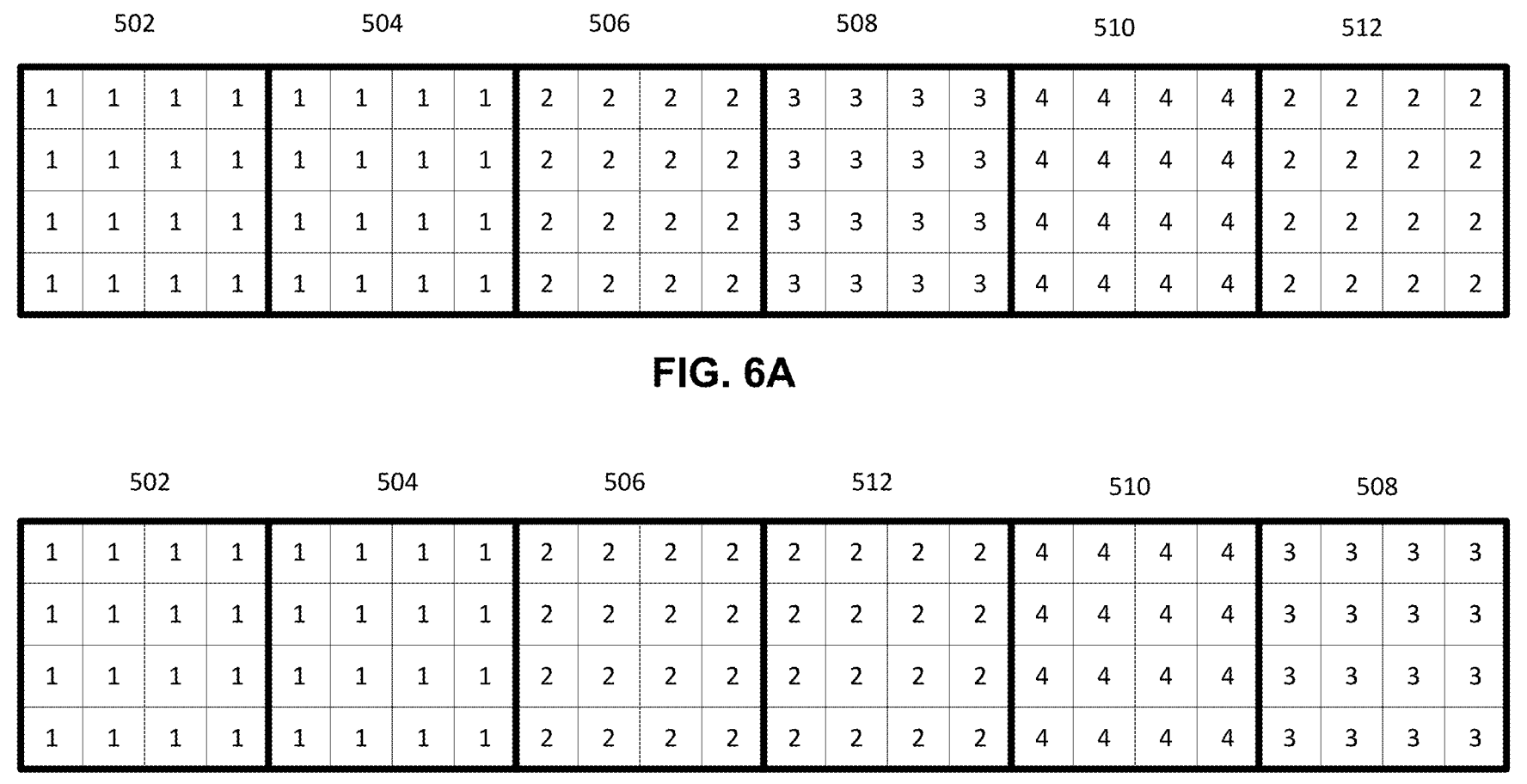

FIGS. 6A and 6B illustrate different sub-block scanning orders that may be used to encode the sub-blocks illustrated in FIG. 5, in accordance with some embodiments. FIG. 6A illustrates the sub-blocks shown in FIG. 5 scanned in horizontal raster scanning order, wherein the rows of sub-blocks (each comprising 3 sub-blocks) are scanned sequentially (e.g., from top to bottom) in a particular direction (e.g., from left to right). As such, the illustrated sub-blocks are scanned in the following order: 502, 504, 506, 508, 510, and 512.

On the other hand, FIG. 6B illustrates the sub-blocks scanned in horizontal traverse order. Horizontal traverse order comprises scanning the rows sequentially in alternating directions, such that each scanned sub-block neighbors a previously scanned sub-block. For example, as illustrated in the figure, the first row of sub-blocks is scanned from left to right, followed by the second row of sub-blocks scanned from right to left. As such, the illustrated sub-blocks are scanned in the following order: 502, 504, 506, 512, 510, and 508.

In some embodiments, other types of scanning orders may be used. These may include vertical raster scanning order (columns scanned sequentially in a particular direction) and vertical traverse scanning order (columns scanned sequentially in alternating directions).

As stated above, pixels and/or sub-blocks that neighbor each other are more likely to have the same or similar pixel values. For example, as illustrated in FIG. 5, sub-blocks 502 and 504 have the same pixel values, while sub-blocks 506 and 512 also have the same pixel values. In order to reduce the number of bits needed to encode the video data, it is often desirable for sub-blocks having the same or similar pixel values be scanned sequentially. As such, for the particular sub-block pattern illustrated in FIG. 5, horizontal traverse scanning order would be preferred over horizontal raster scanning order, due to horizontal traverse scanning order causing sub-blocks 506 and 512 to be scanned sequentially, thus potentially reducing the amount of bits that are needed to encode the video data.

In some embodiments, in order to choose which scanning order to use when encoding the block, a video encoder may evaluate a number of different candidate scanning orders. These may include horizontal and vertical raster scanning orders, horizontal and vertical traverse scanning orders, and/or the like. The video encoder may calculate a cost for at least one candidate scanning order, wherein the cost is indicative of a bit rate that would be used if the block was encoded using the candidate scanning order was used. The encoder may then select a candidate scanning order associated with the lowest cost. For example, with reference to the block illustrated in FIG. 5, the cost associated with horizontal raster scanning order (FIG. 6A) may be determined to be higher than the cost associated with horizontal traverse scanning order (FIG. 6B). As such, horizontal traverse scanning order may be selected over horizontal raster scanning order.

In some embodiments, individual sub-blocks may be associated with a pixel scanning order, indicating an order that the pixels which make up the sub-block are scanned. In some embodiments, the pixel scanning order for a sub-block may be predetermined, while in other embodiments, it may be adaptively chosen. When the scanning order is adaptively chosen, the order may be signaled into the bitstream. Alternatively, in some embodiments, the order may be inferred from previously parsed/decoded blocks. For example, if the previous block showed a stronger horizontal pattern than a vertical pattern, the current block's scanning order may be inferred to be horizontal. If the previous block showed a stronger vertical pattern than a horizontal pattern, the current block's scanning order may be inferred to be vertical.

If all pixels in a particular sub-block have the same pixel value (e.g., as illustrated in FIG. 5), it may not matter which scanning order is chosen (e.g., all candidate scanning orders may have the same cost), and any scanning order may be selected. However, if the pixels of a particular sub-block are associated with two or more different pixel values, then different scanning orders may be associated with different costs. For example, in some embodiments, the pixels of the sub-block may be encoded using run-length coding. In run-length coding, a run value (or run) specifies a number of subsequent samples (e.g., pixels) have the same pixel value or palette index. In an example for purposes of illustration, a string of consecutive palette indices of a block may be 0, 2, 2, 2, 2, 5. In this example, a video coder may code the second sample (e.g., the first palette index of two) using Value mode (i.e., explicitly signally the value of the palette index). After coding an index that is equal to 2, the video coder may code a run of three, which indicates that the three subsequent samples also have the same palette index of two. In some embodiments, a run may refer to a run of palette indices that are copied from above-neighboring palette indices.

As such, a first pixel scanning order that scans many pixels having the same pixel value in a row would potentially use a smaller number of bits to encode the sub-block compared to a second pixel scanning order that scans through pixels having frequently changing pixel values (e.g., due to first pixel scanning order containing a smaller number of different runs). Thus, the first pixel scanning order would be associated with a lower cost compared to the second pixel scanning order.

FIGS. 7A and 7B illustrate two different sub-blocks 702 and 704, each associated with two or more pixel values, in accordance with some embodiments. Because of the different distribution of pixel values with each of the illustrated sub-blocks, different pixel scanning orders may be associated with different costs for each of the sub-blocks. As such, each of the sub-blocks 702 and 704 may use a different pixel scanning order. For example, sub-block 702 may be encoded using horizontal traverse order, while sub-block 704 may be encoded using vertical raster order, as illustrated in FIG. 7B.

In some embodiments, the scanning order chosen for a particular sub-block may be predicated based at least in part upon a scanning order used by a neighboring sub-block. For example, candidate scanning orders may be limited based upon the scanning order used by the neighboring sub-block. In some embodiments, if a distribution of pixel values within a sub-block is determined to be similar to that of a neighboring sub-block, then the same scanning order used for the neighboring sub-block may be chosen for the sub-block.

Figure 8:
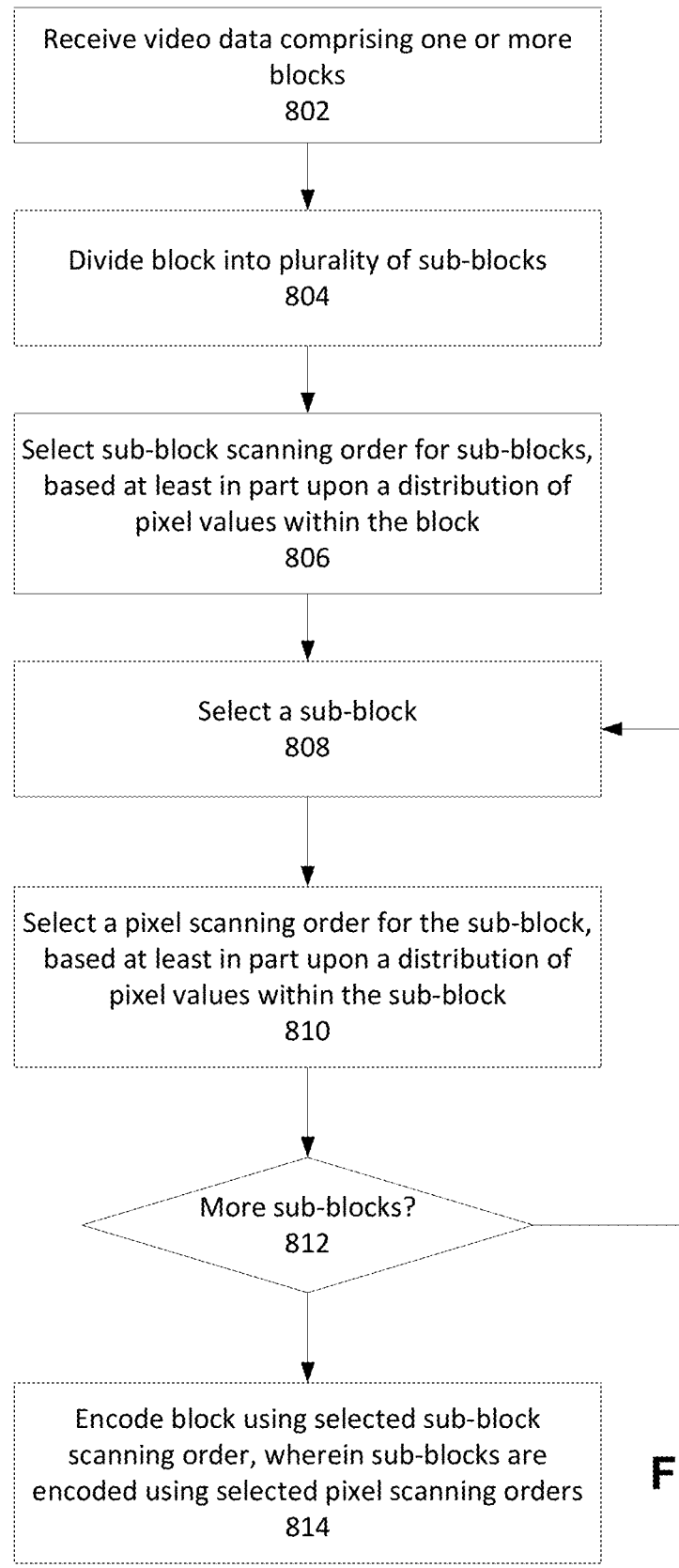
FIG. 8 illustrates a flowchart of a process for encoding a block of video data using adaptive scanning orders, in accordance with some embodiments.

FIG. 8 illustrates a flowchart of a process for encoding a block of video data using adaptive scanning orders, in accordance with some embodiments. The process starts at block 802, wherein video data comprising one or more blocks is received for encoding. The blocks may correspond to CUs, or any other portion of a video image.

At block 804, a block of the one or more blocks is divided into a plurality of sub-blocks. In some embodiments, the sub-blocks comprise square arrays of pixels within the block. For example, the sub-blocks may comprise 4×4 square arrays of pixels within the block. In some embodiments, a palette may be constructed for the block. The palette comprises one or more entries associating index values with pixel values that are present within the block. In some embodiments, the palette may comprise entries corresponding to all of the pixel values present in the block, while in other embodiments, the palette may only comprise entries for a portion of the pixel values present in the block (e.g., most common pixel values, pixel values associated with a threshold amount of pixels within the block, and/or the like).

At block 806, a sub-block scanning order for the block is selected based at least in part upon a distribution of pixel values within the block. In some embodiments, a plurality of candidate sub-block scanning orders may be identified. The candidate sub-block scanning orders may comprise a horizontal raster scanning order, a horizontal traverse scanning order, a vertical raster scanning order, and/or a vertical traverse scanning order. Costs may be determined for one or more of the candidate scanning orders, wherein a cost associated with a candidate scanning order indicates a bit rate that would be used if the block were to be encoded using the candidate scanning order. A candidate scanning order associated with the lowest cost may be selected.

At block 808, a sub-block of the plurality of sub-blocks is selected. At block 810, a pixel scanning order for the selected sub-block is selected, based at least in part upon a distribution of pixel values within the sub-block. In some embodiments, selecting a pixel scanning order may comprise identifying one or more candidate scanning orders. These may include, for example, a horizontal raster scanning order, a horizontal traverse scanning order, a vertical raster scanning order, and/or a vertical traverse scanning order. Costs may be determined for one or more of the candidate scanning orders, wherein a cost associated with a candidate scanning order indicates a bit rate that would be used if the block were to be encoded using the candidate scanning order. A candidate scanning order associated with the lowest cost may be selected.

At block 812, a determination may be made as to whether there are any more sub-blocks for which a pixel scanning order is to be selected. If so, the process may return to block 808, wherein another sub-block of the plurality of sub-blocks may be selected. Else, the process may proceed to block 814, wherein the block is encoded using the selected sub-block scanning order, and wherein the sub-blocks of the block are encoded using their respective selected pixel scanning orders.

Sub-Block Prediction

In some embodiments, it may not always be necessary to encode the pixels of a particular sub-block. Instead, in some cases the pixels of the sub-block can be predicated based upon the pixel values of pixels in other sub-blocks, potentially reducing the bit rate needed to encode the video data.

As described above, sub-blocks that neighbor each other are more likely to have pixels with similar pixel values. For example, a video image may include a large area encompassing multiple sub-blocks having a constant color or pixel value. This may be especially common in computer-generated screen content video images. In some embodiments, all the pixels within a particular sub-block may have the same pixel value, wherein the pixel value may be the same as the pixel value of a pixel in a neighboring sub-block. In such cases, it may be unnecessary to encode the pixels of the sub-block (e.g., using run-length coding). Instead, a flag may be raised signaling that all the pixels of the sub-block are the same as those of the pixel in the neighboring sub-block.

Figure 9:
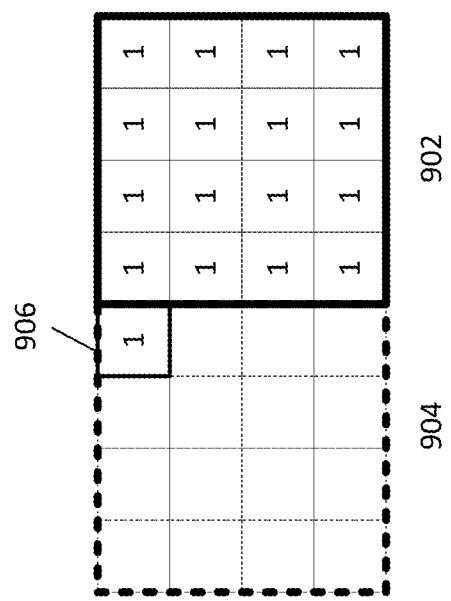
FIG. 9 illustrates a sub-block having a single pixel value that is the same as a pixel of a neighboring sub-block, in accordance with some embodiments.

For example, FIG. 9 illustrates a sub-block having a single pixel value that is the same as a pixel of a neighboring sub-block, in accordance with some embodiments. Sub-block 902 (also referred to as "current sub-block 902") directly neighbors sub-block 904 (also referred to as "neighboring sub-block 904"). All pixels in sub-block 902 have the same pixel value (e.g., pixel value 1). In addition, the pixel value is the same as a particular pixel (pixel 906) in neighboring sub-block 904. When this occurs, it may not be necessary to encode the pixels of current sub-block 902. Instead, a flag may be signaled indicating that all pixels in current sub-block 902 have the same pixel value as pixel 906 of neighboring sub-block 904.

In some embodiments, the pixel of the neighboring sub-block (e.g., pixel 906) that the pixel values of the current sub-block are compared against may be a designated pixel. For example, in some embodiments, such that illustrated in FIG. 9, the designated pixel may be the top-most pixel of the right-most column of the sub-block to the left of the current sub-block. In some embodiments, the designated pixel may be the left-most pixel of the bottom row of the sub-block that is above the current sub-block. In some embodiments, the designated pixel is a pixel that is directly adjacent to the current sub-block. It is understood in other embodiments, the designated pixel may be in other locations within the neighboring sub-block.

Figure 10:
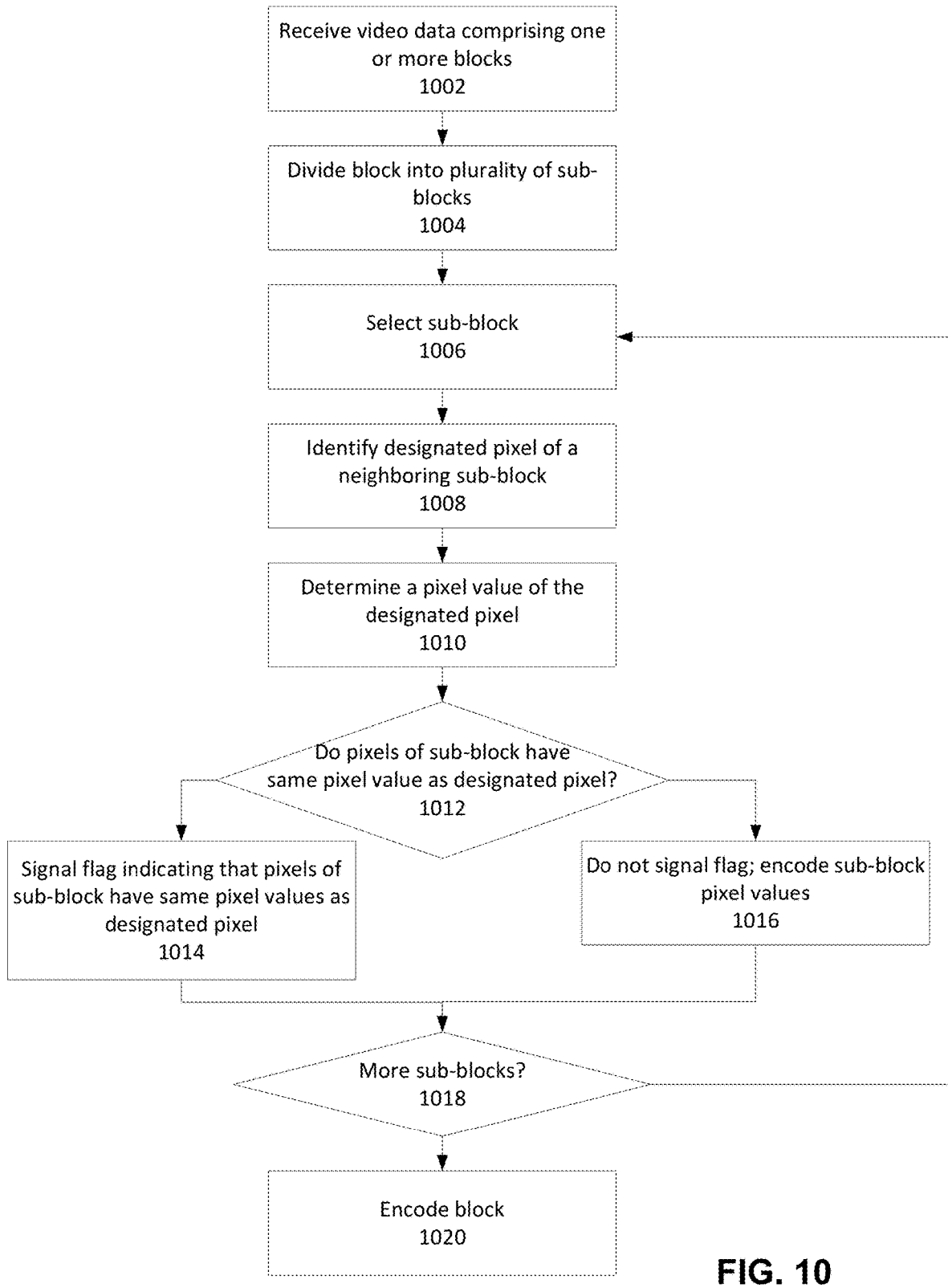
FIG. 10 illustrates a flow chart for implementing sub-block pixel value predication, in accordance with some embodiments.

FIG. 10 illustrates a flow chart for implementing sub-block pixel value predication, in accordance with some embodiments. At block 1002, video data to be encoded is received, wherein the received video data comprises one or more blocks.

At block 1004, a block of the one or more blocks is divided into a plurality of sub-blocks. In some embodiments, the sub-blocks comprise square arrays of pixels within the block. For example, the sub-blocks may comprise 4×4 square arrays of pixels within the block. In addition, in some embodiments, a palette may be constructed for the block, and a sub-block scanning order for the block may be selected. The sub-block scanning order may be selected based at least in part upon a distribution of pixel values within the block.

At block 1006, a sub-block of the plurality of sub-blocks is selected. At block 1008, a designated pixel of a neighboring sub-block of the selected sub-block is identified. In some embodiments, the neighboring sub-block may comprise a sub-block to the left of or above the selected sub-block. The designated pixel may correspond to a particular pixel of the neighboring sub-block. In some embodiments, the designated pixel is selected to be directly adjacent to the selected sub-block. For example, if the neighboring sub-block is to the left the selected sub-block, the designated pixel may be top-most pixel of the right-most column of the neighboring sub-block. On the other hand, if the neighboring sub-block is above the selected sub-block, the designated pixel may be the left-most pixel of the bottom row of the neighboring sub-block. It is understood that in other embodiments, the designated pixel and the neighboring sub-block may be in other locations relative to the selected sub-block.

At block 1010, a pixel value of the designated pixel is determined. In some embodiments, this may comprise identifying an index value that corresponds to the designated pixel. Using a palette (e.g., the palette associated with the block), the identified index value may then be mapped to a pixel value. In some embodiments, the designated pixel may be directly associated with a pixel value. This may occur if the block is not associated with a palette, if the pixel corresponds to a pixel value that is not included in the palette, and/or the like.

At block 1012, a determination is made as to whether all pixels in the selected sub-block have the same pixel value as the designated pixel. In some embodiments, this may comprise first performing a determination that all the pixels in the sub-block have the same pixel value. If so, a determination may then be made as to whether the pixels of the selected sub-block have the same pixel value as the designated pixel. In other embodiments, pixels of the selected sub-block may be compared with the pixel value of the designated pixel until either a non-matching pixel or the end of the selected sub-block is reached. It is understood that in other embodiments, other methods for determining whether all pixels within the selected sub-block have the same pixel value as the designated pixel may be used.

If it is determined that the pixels of the selected sub-block have the same pixel value as the designated pixel, the process may proceed to block 1014, wherein a flag is signaled to indicate that the pixels of the selected sub-block have the same pixel value as the designated pixel. In addition, because it is know that all pixels within the sub-block have the same pixel value as the designated pixel of the neighboring sub-block, there is no need to actually encode the pixel values of the selected sub-block.

On the other hand, if it is determined that not all pixels within the selected sub-block have the same pixel value as the designated pixel, the process may proceed to block 1016, wherein the flag is not signaled. In addition, the pixel values of the selected sub-block will be encoded. In some embodiments, this may comprise selecting a pixel scanning order for the selected sub-block. In some embodiments, the pixel values associated with the pixels of the sub-block may be encoded using run-length coding.

At block 1018, a determination may be made as to whether or not there are additional sub-blocks within the block to be processed. If so, the process may return to block 1006, wherein another sub-block is selected. Else, the process may proceed to block 1020, wherein the block and its sub-blocks are encoded.

Sub-Block Palettes

In some embodiments, a palette for a block may contain a large number of different pixel values (e.g., 16 different pixel values, 32 different pixel values, and/or the like). On the other hand, a particular sub-block within the block may contain a much smaller number of different pixel values (e.g., 2 different pixel values, 4 different pixel values, and/or the like). The larger the number of different pixel values, the more bits that are required for the index. For example, if there are 16 different pixel values, the index values, if using fixed length code, will require 4 bits. On the other hand, if there are only 4 different pixel values, then the index values will only require 2 bits.

In some embodiments, a sub-block may be associated with a sub-block palette. The sub-block palette comprises one or more entries, wherein each entry associates an sub-block index value with a pointer to an entry of the block palette. In some embodiments, the pointer may comprise an index value of the block palette. When encoding the sub-block, pixel values may be specified by referring to a sub-block index value corresponding to the block palette index value that corresponds to the pixel value.

Figure 11:
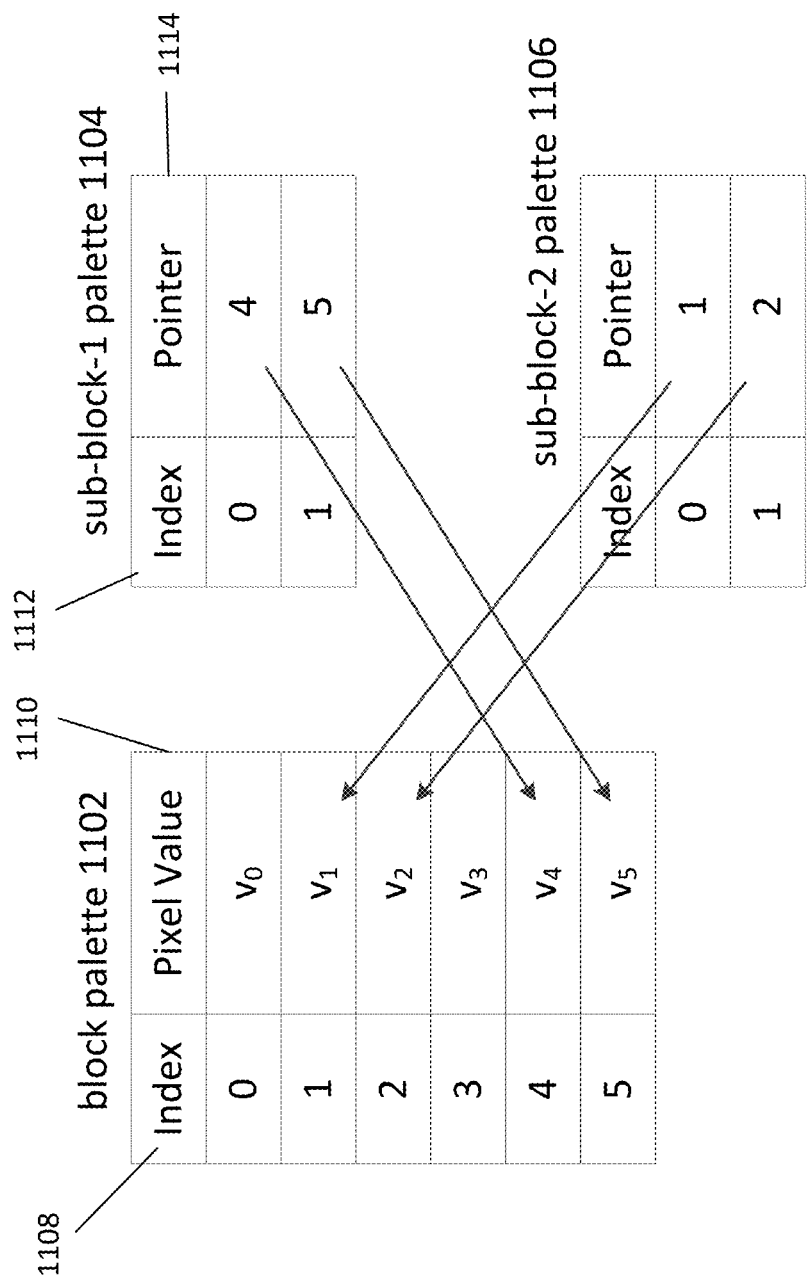
FIG. 11 illustrates a block palette and sub-block palettes, in accordance with some embodiments.

FIG. 11 illustrates a block palette and sub-block palettes, in accordance with some embodiments. A block palette 1102 may map block index values 1108 to pixel values 1110. For example, in the illustrated embodiments, block palette 1102 has a size of 6, mapping six index values to six different pixel values. In embodiments where the index values use fixed length code, the index values will each require at least 3 bits.

The block may contain a first sub-block having a first sub-block palette 1104, and a second sub-block having a second sub-block palette 1106. In the illustrated embodiment, each sub-block has two different pixel values, and thus sub-block palettes 1104 and 1106 each contain two entries. Because there are only 2 entries in each sub-block palette in the illustrated embodiment, the sub-block index values can be expressed using only a single bit.

Each sub-block palette maps sub-block index values 1112 to pixel value pointers 1114, wherein pixel value pointers 1114 point to or reference entries in the block palette 1102 corresponding to pixel values that are present in the sub-block. In some embodiments, the pointers may be index values of entries of block palette 1102. For example, an index value of 0 in first sub-block palette 1104 is associated with a pointer to the entry of block palette 1102 having index value 4, which corresponds to pixel value $v_4$. On the other hand, index value 0 in second sub-block palette 1106 is associated with a pointer to the entry of block palette 1102 having index value 1, which corresponds to pixel value $v_1$. When encoding the first and second sub-blocks, the sub-block index values (1 bit) may be used instead of the block index values (3 bits), potentially reducing the amount of bits required to encode the video data.

Figure 12:
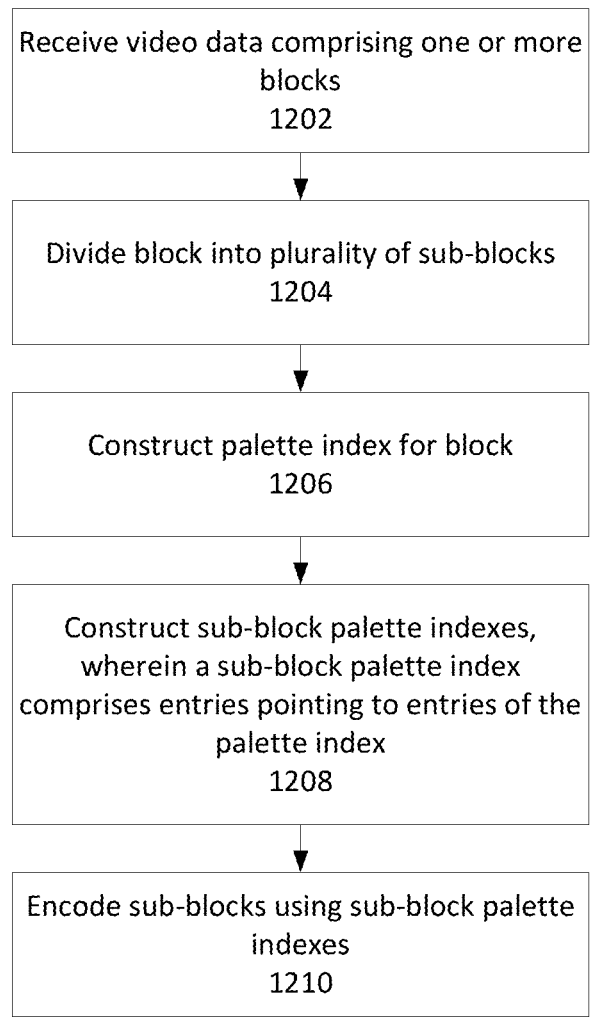
FIG. 12 illustrates a flow chart of a process for implement sub-block palettes, in accordance with some embodiments.

FIG. 12 illustrates a flow chart of a process for implement sub-block palettes, in accordance with some embodiments. At block 1202, video data to be encoded is received, wherein the received video data comprises one or more blocks.

At block 1204, a block of the one or more blocks is divided into a plurality of sub-blocks. In some embodiments, the sub-blocks comprise square arrays of pixels within the block. For example, the sub-blocks may comprise 4×4 square arrays of pixels within the block. In some embodiments, a sub-block scanning order for the block may be selected. The sub-block scanning order may be selected based at least in part upon a distribution of pixel values within the block.

At block 1206 in some embodiments, a palette may be constructed for the block. The palette comprises entries that map pixel values that are present in the block to block index values. In some embodiments, the palette may comprise entries for all unique pixel values present in the block. In other embodiment, the palette may comprise entries for a subset of the unique pixel values present in the block. For example, the palette may comprise entries for the most common pixel values of the block, the pixel values associated with a threshold number of pixels in the block, and/or the like.

At block 1208, sub-block palettes are constructed for sub-blocks within the block, which may be used to specify pixel values that are present within the sub-block. However, the entries of a sub-block palette do not include a pixel value, but instead may contain a pointer pointing to or otherwise referencing an entry of the block palette corresponding to the pixel value. In some embodiments, each sub-block palette entry maps a sub-block index value to a pointer to a corresponding entry in the block palette. In some embodiments, the pointer may comprise an index value of the block palette corresponding to the block palette entry.

At block 1210, the block and its sub-blocks are encoded, wherein each sub-block is encoded using its respective sub-block palette. As such, the pixels of a sub-block are encoded using the sub-block index values of the sub-block palette. When the sub-block is decoded, the sub-block index value may be used by the sub-block palette to determine a block index value, from which a pixel value may be determined using the block palette.

Run-Length Coding

In some embodiments, samples in a palette are coded using run-length coding. Run-length coding comprising, instead of encoding a pixel value and/or index value for each individual pixel, a pixel value or index value may be encoded with a length value indicating a number of sequential pixels having the pixel value. For example, if there are 10 consecutive pixels with same pixel value, instead of encoding ten pixel values or index values corresponding to the ten pixels individually, a single pixel or index value may be encoded with a length value (e.g., 10) indicating a number of sequential pixels having that particular pixel or index value. The length value may also be referred to a "run-length." In some embodiments, run-length coding may be performed using Golomb coding, such as exponential Golomb (ExpGolomb) or Golomb Rice coding.

In some embodiments, a run-length upper bound indicating a maximum run length may be determined. For example, a run-length upper bound for a sub-block may correspond to the number of pixels within the sub-block. The run-length upper bound may be included as part of the encoded sub-block, and used to truncate the run-length coding. For example, in some embodiments ExpGolomb code may be used, wherein the prefix part is changed from unary to truncated unary and the suffix coding part is changed from fixed length code to truncated binary code. In some embodiments, TruncatedRice code is used, wherein the prefix part is changed from unary to truncated unary and the suffix coding part is changed from fixed length code to truncated binary code. Example systems and methods for implementing truncated ExpGolomb and TruncatedRice are disclosed in U.S. Patent Application No. 62/173,215, filed on Jun. 9, 2015, and U.S. patent application Ser. No. 14/719,215, filed on May 21, 2015, both of which are hereby incorporated by reference in their entireties.

Escape Pixels

In some embodiments, a palette for a block may not contain an entry for every unique pixel value that is present in the block. As a result, some pixels within the block will have pixel values that are not represented within the palette. These pixels may be referred to as "escape pixels."

In some embodiments, escape pixels may be identified and marked as a sub-block is being encoded. As pixels that are not escape pixels are encoded, they may be associated with an index value (e.g., block index value or sub-block index value) from which a pixel value may be determined using the palette (e.g., block palette and/or sub-block palette). However, for escape pixels, the pixel value cannot be found in the palette. In some embodiments, a predefined index value (e.g., equal to the block palette size or the sub-block palette size) may be used to mark the occurrence of the escape pixel. In addition, the pixel value of the escape pixel is encoded in the bitstream.

In some embodiments, the pixel value of an escape pixel may be encoded in the bitstream immediately after the marking for the escape pixel (e.g., the predefined index value). However, in other embodiments, pixel values for escape pixels are encoded at the end of the current sub-block. This may be done to make the syntax of the encoded sub-block cleaner and/or increasing the CABAC decoder throughput (by grouping bypass bins together). For example, when decoding the encoded video data bitstream, the decoder will decode the index values and run-lengths of the sub-block. After obtaining the index values and run-lengths, the decoder may then decode the pixel values for the escape pixels. In some embodiments, as a special case, when the block contains only one sub-block (i.e. the block size equals to sub-block size), this configuration result in all of the escape pixel values within the current block being put at the end of the block.

Encoded Bitstream Structure

Figure 13:
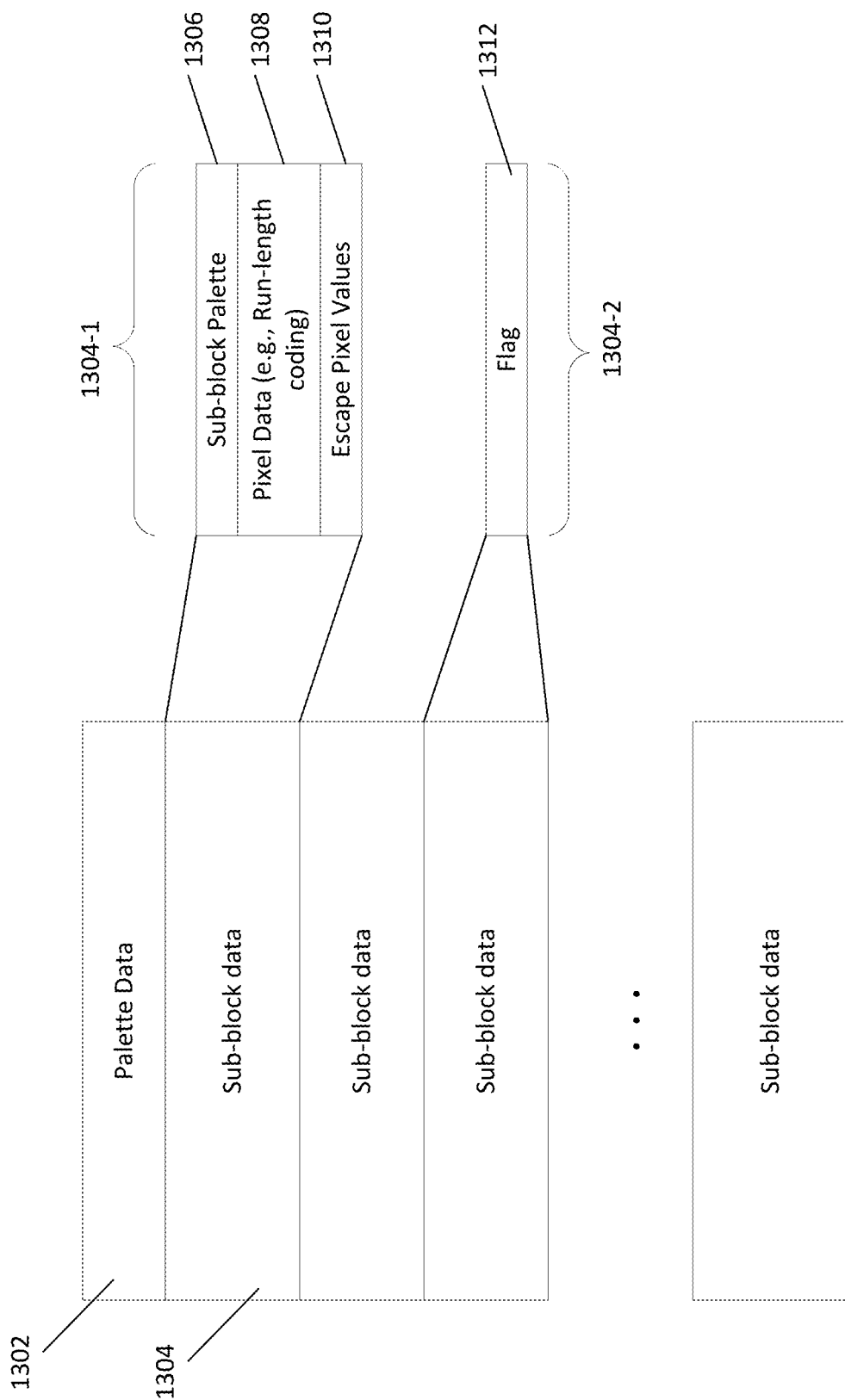
FIG. 13 illustrates a structure of an encoded video data bitstream corresponding to a block, in accordance with some embodiments.

FIG. 13 illustrates a structure of an encoded video data bitstream corresponding to a block, in accordance with some embodiments. In some embodiments, the encoded bitstream corresponding to the block of video data may begin with palette data 1302, wherein the palette data 1302 comprises one or more palette entries that map index values to pixel values. In addition, the bitstream may comprise an indication of a sub-block scanning order that is used by the block.

The encoded bitstream may further comprise data 1304 for a plurality of sub-blocks. In some embodiments, data for a particular sub-block (e.g., data 1304-1) may comprise sub-block palette data 1306. The sub-block palette data 1306 may comprise one or more entries mapping sub-block index values to palette entries of palette data 1302 corresponding to pixel values present in the sub-block. In addition, the pixel scanning order for the sub-block may also be specified.

The sub-block data 1304-1 may further comprise pixel data 1308 indicating pixel values of the pixels within the sub-block. In some embodiments, pixel values are indicated using sub-block index values as defined in the sub-block palette data 1306. In some embodiments, the pixel data may be coded using run-length coding.

In some embodiments, the sub-block may comprise one or more escape pixels. If a particular pixel is an escape pixel, the pixel data 1306 may contain a flag or indicator indicating that the particular pixel is an escape pixel. However, pixel data 1306 may not contain the actual pixel values for the escape pixels. Instead, the pixel values for the escape pixels may be coded after the pixel data 1308 as escape pixel values 1310.

In some embodiments, the pixel values of one or more sub-blocks of the block may be determined based at least in part upon a neighboring sub-block. For example, data for a second sub-block (e.g., data 1304-2) may comprise a signaled flag 1312 indicating that all pixels of the second sub-block have the same pixel value as a designated pixel in a neighboring sub-block. Because the pixel value of all pixels of the second sub-block are already known, it may not be necessary to include sub-block palette data or sub-block pixel data for the second sub-block.

OTHER CONSIDERATIONS

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. A method of encoding video data, comprising:
receiving video data comprising one or more blocks, each block associated with a table indexing pixel values contained within the block, the table having one or more entries each specifying an index to be associated with a different pixel value;
for a block of the one or more blocks:
dividing the block into a plurality of sub-blocks, each sub-block comprising an array of pixels;
selecting a sub-block scanning order for the sub-blocks of the block, the scanning order specifying an order in which the plurality of sub-blocks is to be encoded, based at least in part upon a distribution of pixel values within the block and based on a bit rate for encoding the block according to the scanning order;
for a first sub-block of the plurality of sub-blocks, selecting a first pixel scanning order, the first pixel scanning order specifying an order in which the pixels of the first sub-block are to be encoded, based at least in part upon a distribution of pixel values within the first sub-block and based on a bit rate for encoding the first sub-block according to the first pixel scanning order;
for a second sub-block of the plurality of sub-blocks, selecting a second pixel scanning order, the second pixel scanning order specifying an order in which the array of pixels of the second sub-block are to be encoded, based at least in part upon a distribution of pixel values in the array of pixels within the second sub-block and based at least in part upon a bit rate for encoding the second sub-block according to the second pixel scanning order, wherein the first pixel scanning order limits candidate scanning orders from which the second pixel scanning order is selected; and
encoding the block using the selected sub-block scanning order, wherein the first sub-block is encoded using its selected first pixel scanning order, wherein the second sub-block is encoded using its selected second pixel scanning order, and wherein at least a portion of the array of pixels of the first sub-block and at least a portion of the array of pixels of the second sub-block are encoded using the index values corresponding to the entries of the table.

2. The method of claim 1, wherein pixel values comprise color component values.

3. The method of claim 1, wherein selecting a pixel scanning order for the first sub-block comprises:
identifying a plurality of potential pixel scanning orders;
evaluating a cost for each of the plurality of potential pixel scanning orders, wherein a cost for a potential pixel scanning order of the plurality of potential pixel scanning orders indicates a bitstream length that would be associated with the first sub-block if the potential pixel scanning order is used for the first sub-block; and
selecting a potential pixel scanning order having a lowest cost.

4. The method of claim 3, wherein the plurality of potential pixel scanning orders comprises at least one of: horizontal scanning order, vertical scanning order, horizontal traverse scanning order, and vertical traverse scanning order.

5. The method of claim 1, wherein the sub-block table comprises a plurality of entries, each entry comprising a pointer to a corresponding entry of the table.

6. The method of claim 1, wherein a pixel in the first sub-block is designated an escape pixel, indicating that the pixel of the first sub-block has a pixel value that does not correspond to a pixel value associated with the sub-block table, and wherein the pixel value associated with the escape pixel is encoded after the pixels of the first sub-block that are not designated as escape pixels are encoded.

7. The method of claim 1, wherein the first sub-block is encoded using run-length coding, wherein a run-length value is truncated based at least in part upon a run-length upper bound corresponding to a number of pixels in the first sub-block.

8. The method of claim 1, further comprising:
associating the first sub-block with a sub-block table, the sub-block table referencing a subset of the entries corresponding to pixel values used in the pixels of the first sub-block.

9. A video encoder, comprising:
a memory configured to store video data; and
a processor in communication with the memory and configured to:
receive video data comprising one or more blocks, each block associated with a table indexing pixel values contained within the block, the table having one or more entries each specifying an index to be associated with a different pixel value;
for a block of the one or more blocks:
divide the block into a plurality of sub-blocks, each sub-block comprising an array of pixels within the block;
select a sub-block scanning order for the sub-blocks of the block specifying an order that the plurality of sub-blocks is to be encoded, based at least in part upon a distribution of pixel values within the block by selecting scanning order that is lowest cost if encoded using index values corresponding to entries of the table;
for a first sub-block of the plurality of sub-blocks, select a first pixel scanning order specifying an order that the pixels of the first sub-block are to be encoded, based at least in part upon a distribution of pixel values within the first sub-block, by selecting scanning order that is lowest cost if encoded using index values corresponding to entries of the table;
for a second sub-block of the plurality of sub-blocks, select a second pixel scanning order, the second pixel scanning order specifying an order in which the array of pixels of the second sub-block are to be encoded, based at least in part upon a distribution of pixel values in the array of pixels within the second sub-block and based at least in part upon a bit rate for encoding the second sub-block according to the second pixel scanning order, wherein the first pixel scanning order limits candidate scanning orders from which the second pixel scanning order is selected;
associate the first sub-block with a sub-block table, the sub-block table referencing a subset of the entries corresponding to pixel values used in the pixels of the first sub-block; and
encode the block using the selected sub-block scanning order, wherein the first sub-block is encoded using its selected first pixel scanning order, wherein the second sub-block is encoded using it selected second pixel scanning order, and wherein at least a portion of the pixels of the first sub-block and at least a portion of the array of pixels of the second sub-block are encoded using index values corresponding to the entries of the table.

10. The video encoder of claim 9, wherein pixel values comprise color component values.

11. The video encoder of claim 9, wherein to select a pixel scanning order for the first sub-block, the processor is configured to:
identify a plurality of potential pixel scanning orders;
evaluate a cost for each of the plurality of potential pixel scanning orders, wherein a cost for a potential pixel scanning order of the plurality of potential pixel scanning orders indicates a bitstream length that would be associated with the first sub-block if the potential pixel scanning order is used for the first sub-block; and
select a potential pixel scanning order having a lowest cost.

12. The video encoder of claim 11, wherein the plurality of potential pixel scanning orders comprises at least one of: horizontal scanning order, vertical scanning order, horizontal traverse scanning order, and vertical traverse scanning order.

13. The video encoder of claim 9, wherein the sub-block table comprises a plurality of entries, each entry comprising a pointer to a corresponding entry of the table.

14. The video encoder of claim 9, wherein a pixel in the first sub-block is designated an escape pixel, indicating that the pixel of the first sub-block has a pixel value that does not correspond to a pixel value associated with the sub-block table, and wherein the processor is configured to encode the pixel value associated with the escape pixel after the pixels of the first sub-block that are not designated as escape pixels are encoded.

15. The video encoder of claim 9, wherein the processor is configured to encode the first sub-block using run-length coding, wherein a run-length value is truncated based at least in part upon a run-length upper bound corresponding to a number of pixels in the first sub-block.

* * * * *